United States Patent [19]

Liu

[11] Patent Number: 5,714,929
[45] Date of Patent: *Feb. 3, 1998

[54] MICROPROCESSOR-CONTROLLED SPEEDOMETER/ODOMETER

[76] Inventor: Paul Liu, 10F-3, No. 142, Sec. 3, Min Chuan East Rd., Taipei, Taiwan

[*] Notice: The term of this patent shall not extend beyond the expiration date of Pat. No. 5,475,724.

[21] Appl. No.: 352,841

[22] Filed: Dec. 2, 1994

[51] Int. Cl.[6] .................. B60Q 1/00; G01P 3/48; G01C 21/00
[52] U.S. Cl. .................. 340/441; 340/466; 324/166; 324/171; 377/24.1
[58] Field of Search .................. 340/441, 466, 340/936; 364/426.04, 426.05; 324/160, 161, 166, 171; 377/24.1

[56] References Cited

U.S. PATENT DOCUMENTS

| | | | |
|---|---|---|---|
| 3,614,615 | 10/1971 | Cass | 324/161 |
| 3,704,445 | 11/1972 | Lanham | 324/161 |
| 3,950,700 | 4/1976 | Weisbart | 324/161 |
| 4,124,840 | 11/1978 | Kobayashi | 340/441 |
| 4,314,232 | 2/1982 | Tsunoda | 340/466 |
| 4,491,007 | 1/1985 | Crowdes, Jr. | 324/166 |
| 4,539,642 | 9/1985 | Mizuno et al. | 364/426 |
| 4,742,297 | 5/1988 | Heaton et al. | 324/160 |
| 5,105,150 | 4/1992 | Liu | 324/160 |
| 5,166,610 | 11/1992 | Bezos et al. | 324/160 |
| 5,265,468 | 11/1993 | Holst et al. | 340/441 |
| 5,475,724 | 12/1995 | Liu | 377/24.1 |

*Primary Examiner*—Brent A. Swarthout
*Assistant Examiner*—Van T. Trieu
*Attorney, Agent, or Firm*—Browdy and Neimark

[57] ABSTRACT

A microprocessor-controlled speedometer/odometer including a single-chip microprocessor which is previously recorded with operation programs according to different requirements. The programs of the microprocessor are changeable in accordance with the requirements of different speedometers. Additional functions of setting adjustable limited speed, speeding warning and automatically controlling the limited speed are provided by the microprocessor to enhance the usage and accuracy of the speedometer/odometer.

13 Claims, 2 Drawing Sheets

MICROPROCESSOR-CONTROLLED SPEEDOMETER/ODOMETER

BACKGROUND OF THE INVENTION

The present invention relates to an improved speedometer/odometer, and more particularly to a speedometer/odometer controlled by a microprocessor which is previously recorded with programs according to different requirements. The microprocessor is operably connected with a power supply circuit, a preceding amplifier circuit, a speedometer driving circuit and an odometer counter driving circuit, whereby the signals of speed and mileage are more accurately output for respectively driving the speedometer and odometer counter.

Generally, a car is equipped with a speedometer and an odometer both of which are mounted in a casing. In a conventional speedometer, a coil-driven indicator is used to indicate the numeral scales marked on panel. While in a conventional odometer, a circuit is used to convert the speed signal for driving a decimal gear type counter which accumulates the mileages. Such conventional speedometer/odometer employs complicated assembled electronic circuits. Accordingly, when assembling, testing or servicing such circuits, the output frequency must be adjusted/rectified in order to achieve an accurate output. Such operation is time-costing and tends to result in human error.

The applicant's U.S. Pat. No. 5,105,150 discloses a programmable controlling circuit for car-used speedometer/odometer, in which the mechanical motion of the engine is converted into an electronic signal which is amplified and input to a frequency divider 4. Thereafter, the signal is input to a multiplexer 5. A selecting switch 7 cooperates with the multiplexer 5 to send out a frequency signal within operable range. A F-V converter 6 converts the frequency signal from the multiplexer 5 into a DC voltage signal for driving the indicator of the speedometer 9 to show the speed. The DC voltage signal then goes through a V-F converter 10, a frequency divider 11 and a monostable circuit 12 to be output as a positive pulse wave. The positive pulse wave is sent into a counter for driving a magnet-operated swinging arm so as to rotate a main gear and then drive a row of decimally arranged gears. Each gear is impressed with a digit of 0 to 9 so that the mileages are accumulated. Accordingly, the range of the frequency signal input for the speedometer/odometer is widened in accordance with the car engine.

With respect to the above technique, the output DC voltage is first used to drive the indicator of the speedometer and then converted into the frequency signal for the odometer counter to count the mileages. Several shortcomings exist in such arrangement as follows:

1. The Sin and Cos coordinate coils of the speedometer will be warmed up. This will lead to the biasing of the voltage of the IC and thus affect the accuracy thereof.

2. The error of the speedometer caused by temperature difference or mechanical vibration must be adjusted by a variable resistor so as to zero the indicator of the speedometer. Such adjustment will result in change of the output DC voltage and thus affect the accuracy of counting of the mileages.

3. In the conventional circuits, one single IC chip can provide only one single fixed function. Therefore, a relatively complicated circuit layout is necessary for providing multiple functions and such circuit layout is only suitable for a specific speedometer/odometer.

SUMMARY OF THE INVENTION

It is therefore a primary object of the present invention to provide an improved speedometer/odometer to eliminate the above shortcomings. The improved speedometer/odometer is controlled by a microprocessor in which software programs are previously recorded according to the requirements of different specifications of speedometers/odometers. Therefore, the circuits in the present speedometer/odometer can be freely applied to instruments/meters with different specifications without changing the design of the circuits.

It is a further object of the present invention to provide the above speedometer/odometer including a multi-functional single-chip microprocessor 8051 which has the function of adjusting the limited speed.

It is still a further object of the present invention to provide the above speedometer/odometer including the multi-functional single-chip microprocessor 8051 which has the function of speeding warning.

It is still a further object of the present invention to provide the above speedometer/odometer including the multi-functional single-chip microprocessor 8051 which has the function of automatically controlling the limited speed.

It is still a further object of the present invention to provide the above speedometer/odometer in which when assembled, tested or installed, it is unnecessary to adjust/rectify the frequency and an operator only needs to adjust the variable resistor VR1 to change the output of the coil.

According to the above objects, the present microprocessor-controlled speedometer/odometer includes separate speedometer-driving circuit and odometer counter-driving circuit so as to avoid accumulation of error. In addition, the multi-functional single-chip microprocessor of the present invention is previously recorded with software programs according to different functions so that the speedometer/odometer can be applied to different vehicles and situations. Moreover, the functions of setting adjustable limited speed, speeding warning and automatically controlling the limited speed enhance the usage of the speedometer/odometer. The circuit of the present invention only includes a preceding amplifier circuit U1 (CA3140), a speedometer driving circuit U2 (LM1819) and a single-chip microprocessor (MCPU) to achieve the following advantages:

1. Accurate output.

2. It is unnecessary to perform adjustment/rectification of frequency and an operator only needs to adjust the variable resistor to change the output of the coil.

3. The circuit is simple and can be mass-produced to reduce the cost.

4. Additional functions of setting adjustable limited speed, speeding warning and automatically controlling the limited speed are provided.

The present invention can be best understood through the following description and accompanying drawings, wherein:

DETAILED DESCRIPTION OF THE PREFERRED EMBODIMENT

Figure 1:
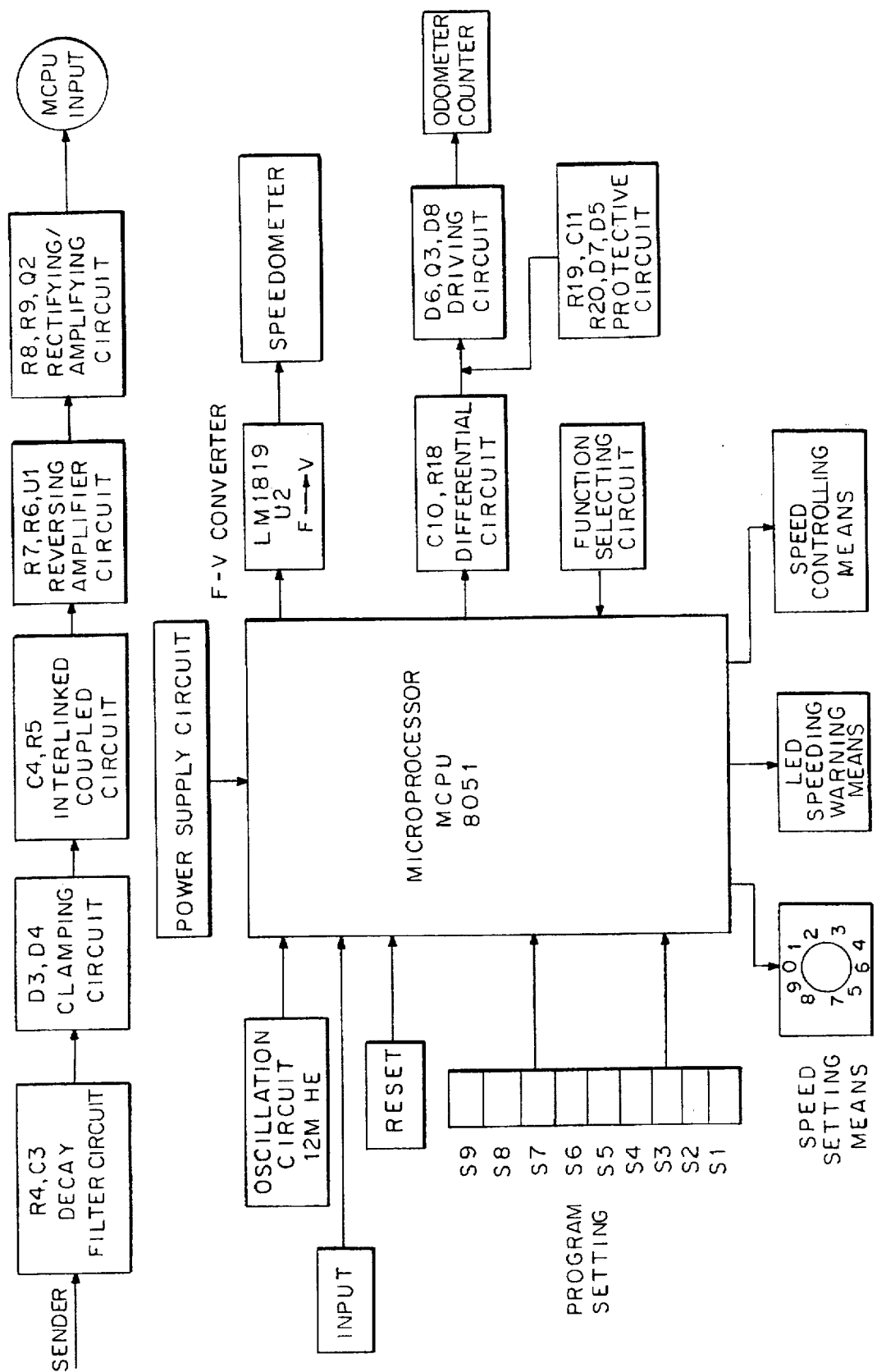
FIG. 1 is a block diagram of the present invention.
Figure 2:
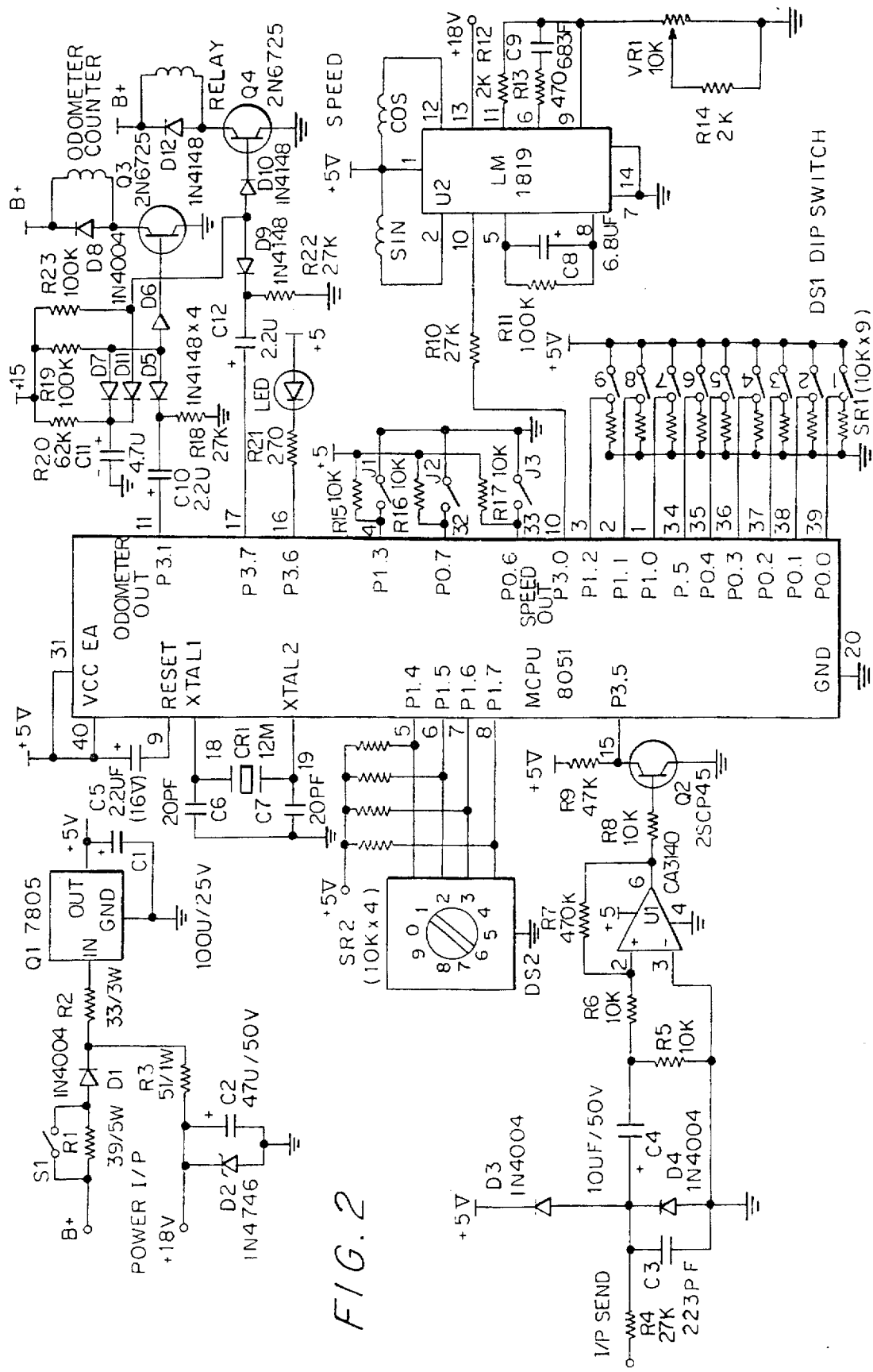
FIG. 2 is a circuit diagram of the present invention.

Please refer to FIGS. 1 and 2. The power supply circuit of the present invention includes a first portion formed by R1, Q1 and C1 for +5V stabilization, a second portion formed by R1, D2 and C2 for +18V stabilization and a third portion formed by S1, R1 and D1 for switching between 12V/24V power system.

First, the signal is input by a decay filter circuit formed by R4, C3 for filtering the input signal. D3, D4 form a clamping circuit for avoiding negative pulse and positive pulse, wherein the signal voltage is set within −0.7V to +5V and the diode driving voltage is set to be 0.7V. C4, R5 form an interlinked coupled circuit for isolating DC current. R5, R6, R7, CA 3140 U1 form a reverser in which the increment ratio is:

$$A = \frac{-R7}{R6}$$

The amplified signal goes through R8, Q2, R9 and then is input to the microprocessor (MCPU) which calculates the input signals to obtain the input frequency.

The MCPU reads the signals of 9 switches of permutated resistor DS1 (Dip switch), wherein the S7, S8 and S9 are for frequency division judgement. There can be $2^3=8$ kinds of arrangements and the range of frequency division is $f_{1\ in}/\sim f_{8\ in}$.

S1, S2, S3, S4, S5, S6 are for signal substraction. There are $2^6$ kinds of variations. When the input signal has different frequency, the user only needs to set the nine switch signals of DS1.

For example, when the output frequency of MCPU through R10 to U2 is 121 HZ at full scale (at this time all of S1 to S9 are off), the corresponding speed is 85 MPH. The 121 HZ is frequency-divided by MCPU to obtain accurate signal for actuating the relay in the odometer and generating instantaneous magnetic field to drive the swinging arm of the decimal gear counter of the odometer. Therefore, during the time interval corresponding to each signal the rightmost gear is rotated to accumulate mileages.

DS2 is a limited speed adjusting switch. After MCPU reads the limited speed data, DS2 is used to output speeding warning signal and limited speed controlling signal.

The speedometer/odometer mounted on different vehicles with different functions or usages should have different full scale. In the present invention, there are $2^3=8$ kinds of assemblies of R15, R16, R17 by means of the setting of the selecting switches J1, J2, J3. Therefore, the speedometer/ odometer of the present invention is applicable to 8 kinds of specifications.

C10, R18, D6, Q3, D8 form a differential circuit for driving the counter of the odometer. D5, D7, C11, R19, R20 form a protective circuit for preventing the counter from counting due to the instantaneous pulse generated when powered on. R21 and LED form a limited speed warning circuit, whereby when the running speed reaches a set value, the LED will automatically flicker to warn the driver. The LED can be replaced by other light-emitting means or voice-emitting means such as a buzzer or a speech synthesizer. Accordingly, when the running speed exceeds the set safety value, a warning sound or voice is generated to caution the driver.

C12, R22, D10, D12 and Q4 form a limited speed circuit, whereby the output signal thereof controls a relay RELAY. D9, D11, R22 form a protective circuit for preventing the relay RELAY from being actuated by the instantaneous pulse generated when powered on.

CR1, C6, C7 form a quarts oscillation circuit, wherein the oscillation frequency is 12 MHZ. C5 is a reset circuit.

U2, R11, R12, R13, R14, VR1, C8, C9 and Sin and Cos coils form a frequency driving speedometer circuit.

The above embodiment is only an example of the present invention and the scope of the present invention should not be limited to the example. Any modification or variation derived from the example should fall within the scope of the present invention.

What is claimed is:

1. A microprocessor-controlled speedometer/odometer comprising:
   a power supply circuit;
   a decay filter circuit;
   a clamping circuit for avoiding negative and positive pulses;
   a reversing amplifier circuit;
   a microprocessor for receiving signals output from said reversing amplifier circuit and calculating the input signals to obtain the input frequency;
   a differential circuit for driving a counter of the odometer;
   a quartz oscillation circuit coupled to the microprocessor;
   a reset circuit; and
   a frequency-driver speedometer driving circuit.

2. A speedometer/odometer as claimed in claim 1, wherein said microprocessor has previously recorded changeable programs according to different specifications and functions of said speedometer/odometer.

3. A speedometer/odometer as claimed in claim 1, wherein said microprocessor is operably connected with a limited speed adjusting switch for selectively setting a limited speed.

4. A speedometer/odometer as claimed in claim 1, wherein said microprocessor is operably connected with a speeding warning means.

5. A speedometer/odometer as claimed in claim 1, wherein said microprocessor is operably connected with a limited speed automatically controlled means for restricting running speed of a vehicle below a set limited speed.

6. A speedometer/odometer as claimed in claim 4, wherein said speeding warning means is a light-emitting means.

7. A speedometer/odometer as claimed in claim 4, wherein said speeding warning means is a sound-emitting means.

8. A speedometer/odometer as claimed in claim 6, wherein said light-emitting means is an LED.

9. A speedometer/odometer as claimed in claim 7, wherein said sound-emitting means is a buzzer.

10. A speedometer/odometer as claimed in claim 7, wherein said sound-emitting means is a speech synthesizer.

11. A speedometer/odometer as claimed in claim 2, wherein said microprocessor is operably connected with multiple selecting switches of parallel resistors, whereby an assembled sequence of the selecting switches is changeable to alternatively set scales of the speedometer.

12. A system for driving a speedometer to output a vehicle speed reading from electrical speed sensor pulses from a sensor, the system comprising:
   (a) signal treatment means for amplifying and shaping the sensor pulses;
   (b) a microprocessor coupled to the means for amplifying and shaping, the microprocessor including division-selection means for selecting a frequency-division ratio, means for frequency-dividing the sensor pulses by the frequency-division ratio to produce output pulses at a lower frequency;

(c) a speedometer-driving circuit coupled to the microprocessor and to the speedometer; and (d) power supply means for powering the system;

whereby in operation the speedometer displays a speed proportional to a frequency of the sub-divided pulses.

13. The system according to claim 12, wherein the speedometer-driving circuit includes a frequency-to-voltage converter.

\* \* \* \* \*